(12) United States Patent
Eberhardt et al.

(10) Patent No.: US 6,811,136 B2
(45) Date of Patent: Nov. 2, 2004

(54) PIEZOELECTRIC VALVE

(75) Inventors: Wolfgang Eberhardt, Stuttgart (DE); Heinz Kück, Stuttgart (DE); Carsten Pein, Affalterbach (DE); Frank Pöhlau, Fürth (DE); Andreas Schmid, Michelau (DE); Stefan Klump, Lichtenfels (DE); Michael Riedel, Rödental (DE); Jürgen Sestak, Lichtenfels (DE); Udo Töpfer, Michelau (DE); Hubert Krämer, Steinwiesen (DE); Martin Maichl, Salach (DE); Markus Hoffman, Wolfschlugen (DE); Gebhard Munz, Schorndorf (DE); Michael Weinmann, Plüderhausen (DE)

(73) Assignee: Festo AG & Co., Esslingen (DE)

( * ) Notice: Subject to any disclaimer, the term of this patent is extended or adjusted under 35 U.S.C. 154(b) by 3 days.

(21) Appl. No.: 10/440,818

(22) Filed: May 19, 2003

(65) Prior Publication Data

US 2003/0222236 A1 Dec. 4, 2003

(30) Foreign Application Priority Data

May 31, 2002 (EP) ............................................ 02012020

(51) Int. Cl.⁷ ............................................ F16K 31/02
(52) U.S. Cl. .................. 251/129.06; 251/368
(58) Field of Search ............................ 251/129.06, 368

(56) References Cited

U.S. PATENT DOCUMENTS 5,381,817 A * 1/1995 Gassman et al. ...... 251/129.06
5,628,411 A * 5/1997 Mills et al. ............. 251/129.06
5,779,218 A * 7/1998 Kowanz ................ 251/129.06
6,086,041 A * 7/2000 Gattuso et al. ........ 251/129.06
6,164,621 A * 12/2000 Bouchard et al. ...... 251/129.06
6,499,509 B2 * 12/2002 Berger et al. .......... 251/129.06

FOREIGN PATENT DOCUMENTS

EP       1 158 182       11/2001

OTHER PUBLICATIONS

Belforte, et al. "Valvole pneumatiche Commerciali con Azinoamento Piezoeltrico" Oleodinamica, Pneumatica, Tecniche Nuove. (Mar. 2000).

* cited by examiner

*Primary Examiner*—John Bastianelli
(74) *Attorney, Agent, or Firm*—Hoffmann & Baron, LLP

(57) ABSTRACT

A piezoelectric valve whose housing defines a valve chamber wherein at least one piezoelectric flexural transducer is located. The piezoelectric flexural transducer possesses a contact face, which faces a first outer wall of the valve housing. This first outer wall is in the form of a wiring support which possesses a support body consisting of plastic material, which at the outer side opposite to the valve chamber bears a wiring arrangement. The wiring arrangement is in electrical contact by way of a via extending through a cutout in the support body with the piezoelectric flexural transducer, since the via consists of an electrically conductive elastic plug, against which the at least one contact face is thrust at the inner face of the support body.

16 Claims, 2 Drawing Sheets

PIEZOELECTRIC VALVE

BACKGROUND OF THE INVENTION

The invention relates to a piezoelectric valve comprising a valve housing, which defines a valve chamber, said valve chamber containing at least one actuating member in the form of a piezoelectric flexural transducer provided, for making electrical contact with it, with at least one contact face facing an outer wall of the valve housing.

THE PRIOR ART

In the case of a piezoelectric valve disclosed in the European patent publication 1158182 A1 of this type the making of electrical contact with the piezoelectric flexural transducer is ensured by electrical connecting lines, which are soldered to the piezoelectric flexural transducer's contact faces provided in the interior of the valve chamber and are also connected with electrical connection contacts, which extend through a side wall of the valve housing to the outside. These contact making measures are comparatively intricate. Moreover any electronic control circuitry desired can not be readily installed on the piezoelectric valve.

SHORT SUMMARY OF THE INVENTION

One object of the invention is thus to provide a piezoelectric valve of the type initially mentioned which more particularly as regards electrical features is so designed that it permits simpler assembly.

In order to achieve these and/or other objects appearing from the present'specification, claims and drawings, in the present invention the said outer wall of the valve housing is designed in the form of a wiring support, which possesses a support body consisting of plastic material, said body bearing, on the outer side opposite to the valve chamber, a wiring arrangement provided for electrical control of the piezoelectric flexural transducer and having electrical lines and/or electronic components, said wiring arrangement being in contact by way of at least one via, extending through a cutout in the support body, with the piezoelectric flexural transducer since such via comprises an electrically conductive elastic plug against which the at least one contact face for the piezoelectric flexural transducer is thrust at the inner side of the support body.

The wiring arrangement for the control of the piezoelectric flexural transducer is in this case, separate from the operating medium of the piezoelectric valve, outside the valve chamber and is accordingly protected against any undesired effects of the operating fluid. The electrical contact with the piezoelectric flexural transducer is performed by at least one via extending through the support body, which is in the form of an electrically conductive elastic plug assuming not only an electrically conducting function but also a contact function since it makes electrical contact by touching the contact face for the piezoelectric flexural transducer, more particularly in the interior of the valve chamber. Owing to the rubber-elastic properties of the elastic plug, against which the contact face is thrust, and the resulting return forces, there is an extremely reliable electrical connection. Furthermore the rubber-like elasticity of the elastic plug means a generous allowance for component manufacturing inaccuracies of the piezoelectric valve. Last but not least the elastic plug may also, given a suitable configuration, be in a position to provide for fluid-tight sealing of the cutout in which it is placed so that no fluid may flow through it from the interior of the valve to the outside. All in all the design in accordance with the invention provides for a relatively simple structure and economical assembly, the wiring arrangement being designed, if required, in the form of control electronic circuitry for the at least one piezoelectric flexural transducer without rendering assembly more technically involved.

Further advantageous developments of the invention are defined in the claims.

The outer wall fitted with the wiring arrangement and adapted to function as a wiring support is preferably in the form of a cover of the valve housing. During assembly there is the possibility of firstly fitting the other valve housing components with the piezoelectric flexural transducer and then performing the rest of assembly operations by simply putting on the cover.

The elastic plug is preferably an electrically conductive elastomeric or rubber body, which preferably comprises a rubber-elastic material in which the particles responsible for the electrical conductivity are embedded. The electrically conductive particles are more particularly metal particles or metallized plastic particles.

During the manufacture of the piezoelectric valve the elastic plug in the form of a prefabricated elastic body may be inserted into the respective cutout. More particularly as regards optimum sealing it is however considered to be more advantageous for the elastic plug to be formed by the introduction of liquid or pasty material into the cutout which is then cured to produce the desired rubber-elastic properties. In this case the elastic material can make optimum snug contact with the wall face of the cutout in the support body.

An optimum allowance for manufacturing inaccuracies can be expected if, for making contact with the associated contact face, the elastic plug possesses a contacting head projecting past the support body. This contact head like a contact bump will preferably possess a cross section which is large in comparison with the cutout so that it straddles or overlaps the support body in an interlocking manner at the edge of the cutout. This is responsible for an additional interlocking attachment of the elastic plug to resist high pressures occurring in the interior of the valve.

Together with at least parts of the wiring arrangement the support body is preferably fashioned as a molded interconnect device (MID). In this connection there is then the advantageous possibility of providing the wiring arrangement with electrical lines, which are formed as printed wiring structures on the support body using hot embossing technology.

There has in connection with valves admittedly already been a suggestion to resort to MID's. Thus for instance the German: patent publication 19722925 C1 discloses a connection element for electromagnets of valve units and having a support body, through which several vias extend from one side to the other. The vias are however in this case constituted by conventional printed wiring, which must be produced in an involved wet electroplating operation. Furthermore, the German patent publication 199212659 A1 discloses a micro-valve arrangement with an integrated wiring support, which possesses electrical conductors and furthermore electronic components. The wiring arrangement is however located in the interior of valve housing of the micro-valve arrangement and furthermore there are no vias in the form of rubber-elastic bodies.

An optimum electrical connection between the elastic plug and the electrical lines of the wiring arrangement is produced if the printed wiring structure possesses a via passage aligned with the associated cutout, such passage being defined by bent over sections of the printed wiring structure and a contact bump or projection like a spigot extending coaxially into the cutout, such bump having the electrically conductive elastic plug extending through it. The contact making bump may be produce in an extremely simple manner by piercing the printed wiring structure covering over the cutout, sections of the printed wiring structure being bent over inward into the cutout and preferably coming to rest on the wall of the cutout.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 7:
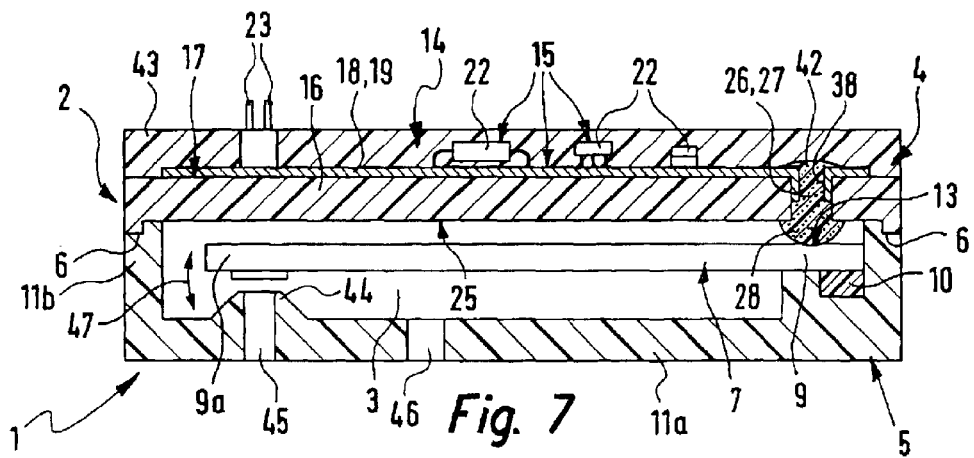
FIG. 7 shows a piezoelectric valve with a preferred structure using the wiring support.

FIG. 7 shows a piezoelectric valve generally referenced 1. It is employed for the control of the flow of a fluid, it being a question of a hydraulic or gaseous medium and more especially compressed air.

The piezoelectric valve possesses a valve housing 2, which defines an interior space which constitutes a valve chamber 3. It is a question of a two-part valve housing 2 in the embodiment, such valve housing 2 having a first housing part 4 and a second housing part 5, such two housing parts 4 and 5 being connected at a join 6 and for example joined together by bonding or welding permanently to provide a seal.

In the valve chamber 3 of the valve housing 2 at least one electrical piezoelectric flexural transducer 7 is located which constitutes the actuating member of the piezoelectric valve. The piezoelectric flexural transducer 7 possesses an inherently conventional structure with an elongated configuration. It consists of piezoelectric material and more particularly piezoelectric ceramic material and preferably has a multi-layer structure.

The piezoelectric flexural transducer 7 is secured at a rear end part 9 to the second housing part 5 using a suitable attachment means. In the working example it is held by adhesive.

On the side facing the first housing part 4 the piezoelectric flexural transducer 7 is provided with at least one electrically conductive contact face 13, by way of which the electrical operating power is transmitted to the piezoelectric flexural transducer 7. The contact face 13 is for example a component of printed wiring.

The second housing part 5 has a floor 11a and a surrounding side wall 11b extending out toward the first housing part 4, and defining a recess in which the piezoelectric flexural transducer 7 is located.

The first housing part 4 constitutes a cover for the housing 2 and is mounted at the join 6 in a fluid tight manner on the end face, facing away from the floor 11a, of the side wall 11b so that the valve chamber 3 is formed.

Opposite to the front end part 9a of the piezoelectric flexural transducer 7 there is a valve seat 44 on the bottom side facing the floor 11a of the second housing part 5, such valve seat 44 delimiting the opening of a first valve duct 45 directed into the valve chamber. A further valve duct 46 opens at a different position into the valve chamber 3. By way of electrical activation the piezoelectric flexural transducer 7 may be caused to perform a switching movement 47 indicated by a double arrow, such movement involving bending toward the valve seat 44 and away from the seat 44. It is more especially possible to selectively set the piezoelectric flexural transducer 7 in the open position illustrated in FIG. 7 clear of the valve seat 44 or in a closed position on the valve seat 44 closing the first valve duct 45. Accordingly such a fluid control is possible that fluid transfer between the two valve ducts 45 and 46 is selectively rendered possible or is prevented. It is a question of a 2/2 valve function. However it would be readily possible to design the piezoelectric valve 1 with a different valve functionality, for example as a 3/2 way valve, there then being at least one further valve duct opening into the valve chamber 3.

In the working embodiment illustrated the piezoelectric flexural transducer 7 constitutes both the actuating member and also the valve member of the piezoelectric valve 1. It is however possible to have a design in which the piezoelectric flexural transducer only performs the function of the actuating member and during activation acts directly or indirectly on a separate valve member in order to actuate and set it as desired.

The first housing part 4 constitutes an outer wall of the valve housing 2 and is formed a wiring support 14. The latter is provided with a generally referenced 15 wiring arrangement, by way of which the transmission of the electrical actuating signals to the piezoelectric flexural transducer 7 takes place.

As regards details the wring support 14 has a support body 16 consisting of plastic material, and which in the working embodiment is plate-like or tabular and at the join 6 produces the connection with the second housing part 5. That is to say in fact, the valve chamber 3 is delimited by the second housing part 5 and the support body 16.

The wiring arrangement 15 is located on the outer side 17, facing away from the valve chamber 3, of the valve support 16. It contain electrical conductors 18, which are preferably applied by hot embossing as foil like thin printed wiring structures 19 on the support body 16. Furthermore the wiring arrangement 15 comprises several electronic components 22 soldered to the electrical conductors 18. In addition the wiring arrangement 15 is provided with electrical connection contacts 23, which are also connected with the electrical conductors 18 electrically.

The wiring arrangement 15 is electrically connected through the support body 16 with the at least one contact face 13 of the piezoelectric flexural transducer 7. For this purpose the support body 16 is provided with at least one cutout or aperture 24 there being two thereof alongside one another in the present working example extending from the outer side 17 of the support body to the inner side 25, delimiting the valve chamber 3, and which respectively has an electrically conductive via 26 extending through it. The via 26 is on the one hand in contact with the wiring arrangement 15 and on the other hand, at the inner side 25 of the support body 16, is in contact with the associated contact face 13 of the piezoelectric flexural transducer 7. Each via 26 has its own associated contact face 13.

The via 26 is constituted by an electrically conductive elastic plug 27. Such plug is more especially in the form of an electrically conductive elastomeric or rubber body, the desired properties electrical conductivity and at the same time rubber elastic deformability preferably being produced by the use of a rubber-elastic material in which a plurality of electrically conductive metal particles is embedded.

On the inner side of the support body 16 the elastic plug 27 has a contact bump 28 or head extending away from the support body 16. Preferably, the contact making bump 28 has a mushroom- or lentil-like configuration. It presses against the associated contact face 13 of the electrical component 7, it being at least slightly deformed elastically so that owing to the rubber-elasticity there is a certain degree of resilient biasing.

Preferably the piezoelectric valve 11 is so designed that on fitting the two housing parts 4 and 5 together the contact face 13 engages the associated contact head or bump 28 before the final fitted position of the two housing parts 4 and 5 is reached. The result of this is that the desired mutual loaded engagement is brought about with the resulting reliable electrical connection over a large area.

Simultaneously there is a reliable compensation for manufacturing inaccuracies over a large range. The possible elastic deformation of the elastic plug 27 provides a reliable electrical connection despite such manufacturing inaccuracies. There is therefore an electrical contact and a simultaneous compensation of inaccuracies. A further point is that as regards the wiring support 14 and also as regards components responsible for making contact there is contacted directly by the via 26 so that to this extent as well no separate manufacturing process is necessary.

The contact making head or bump 28 is preferably so designed that in comparison with the cutout through which it extends it has a large cross section and overlaps the support body 14 at the edge of the cutout in an interlocking fashion. Accordingly on the one hand the possible contact making area is increased. On the other hand an interlocking attachment of the elastic plug 27 on the support body 16 is produced which prevents undesired release or escape of material of the elastic plug 27 from the cutout 27 toward the first side 17. Accordingly the elastic plug 27 will be anchored even despite a relatively high internal pressure in the valve chamber 3.

At the same time the elastic plug 27 is able to make fluid-tight contact with the support body 16. This may be achieved in an extremely simple manner if the elastic plug 27 is fitted in the cutout 24 with an elastic bias and is biased against the wall of the cutout 24 or if the material of the elastic plug 27 is permanently molded on the support body 16. Accordingly it is possible to ensure that no fluid may escape from the valve chamber 3 through the cutout 24.

In the following a preferred method of manufacture of the wiring support 14 will be explained with reference to FIGS. 1 through 6, further additional design features of the wiring support 14 being indicated.

Figure 1:
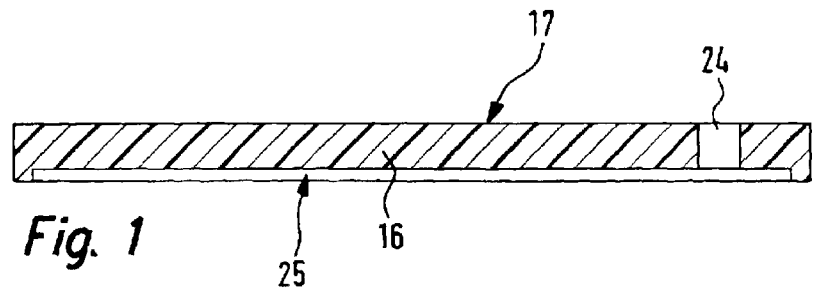
FIGS. 1 through 6 illustrate steps for the manufacture of a preferred wiring support of the piezoelectric valve.

For the manufacture of the wiring support 14 firstly the support body 16 illustrated in FIG. 1 separately is produced. Plastic material is employed therefor, such plastic preferably being injection cast. During injection casting or later as part of a machining operation, the support body 16 has the desired number of cutouts 24 made therein for the vias 26.

Figure 2:
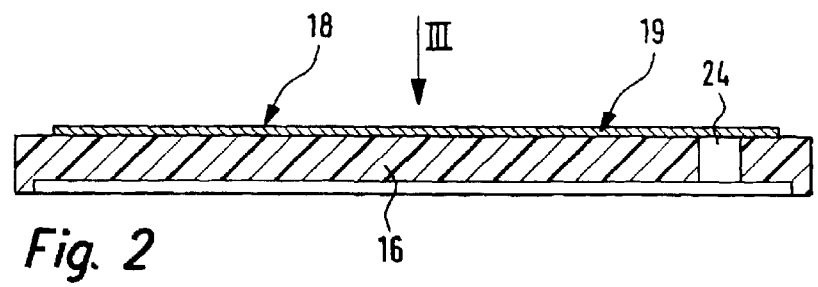
Figure 3:
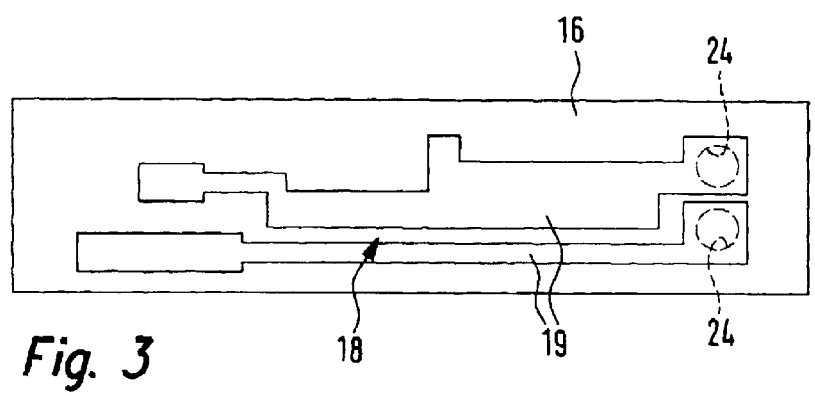

In the following step the electrical conductors 18 of the wiring arrangement 15 are applied to the outer side 17 of the support body 16. This is preferably done by applying a suitably designed printed wiring structure 19 by hot embossing to the outer side 17 of the support body 16. This printed wiring structure 19 is here so designed that it covers over the cutout 24 to be provided with a via 26 as is depicted in FIG. 2 and in FIG. 3 showing a view as indicated by the arrow III in FIG. 2.

The support body 16 accordingly constitutes, together with the components applied to it of the wiring arrangement 15 a molded interconnect device (MID) produced using embossing technology.

Figure 4:
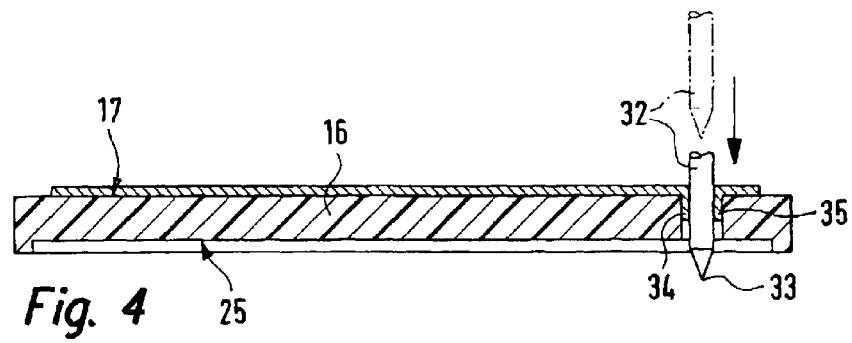

In the following method step the printed wiring structure 19 is pierced using a suitable awl 32 coming from the outside (FIG. 4). The awl 32 jabs into the cutout 24, preferably so far that it comes out at the second side 25.

To ensure that the printed wiring structure 19 is neatly penetrated or pierced the awl 32 has a suitably designed point 33 at its front end. It preferably has a tapering conical configuration.

On piercing the printed wiring structure 19 the sections 34 around the point of piercing the printed wiring structure 19 are bent inward right into the cutout 24, to rest against the wall of the cutout 24 around them. Preferably the diameter of the awl 32 is equal to the difference between the diameter of the cutout 24 and twice the thickness of the printed wiring structure 19. However, a somewhat larger cross section of the awl 32 may be employed in order to ensure a certain degree of squeeze of the bent over printed wiring material and accordingly an optimum, snug fit on the wall of the cutout 24 and a simultaneous smoothing out of any folds present.

The piercing operation is illustrated in FIG. 4. After piercing, the awl 32 is withdrawn from the cutout 24 again, the bent over sections 34 remaining as a spigot-like contact making projection 35 coaxially protruding into the cutout 24. The projection 35 is an integral part of the printed wiring structure 19.

The piercing of the printed wiring structure 19 for the purpose of producing the annular contact making projection 25 can be also performed directly on embossing the printed wiring structure 19 in place.

Figure 5:
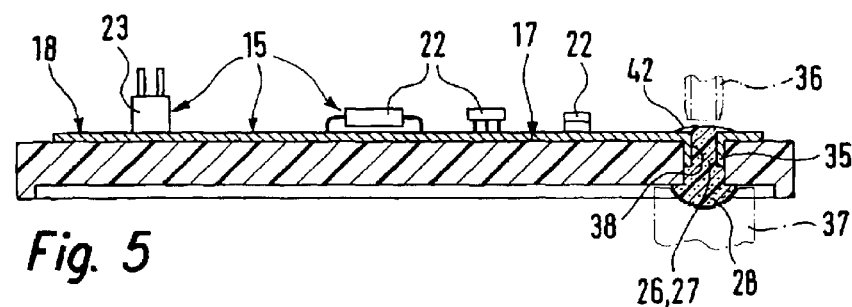
Figure 6:
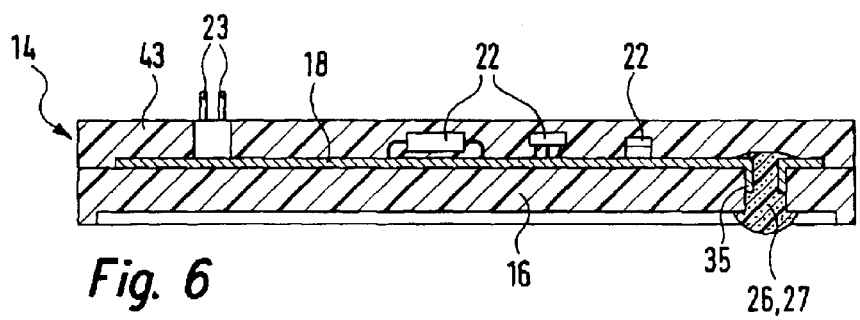

As the next step the electronic components 22 and the electrical connection contacts 23 are placed on the outer side 17 of the support body 16 and electrically connected using conventional soldering methods with the printed wiring structure 19 and at the same time fixed in position. Thus the wiring arrangement 15 is completed. This condition is indicated in FIG. 5.

The wiring arrangement 15 is more particularly so designed that it constitutes electronic control circuitry for the at least one piezoelectric flexural transducer 7 accommodated in the valve chamber 3. The electronic control circuitry is preferably designed at least to perform a charging and discharging function, which produces the actuating power necessary for activating the piezoelectric flexural transducer and on deactivation provides for the desired draining of electrical charges. The actuating voltage is preferably below 60 volts, and preferably is 24 volts. If desired the wiring arrangement may also constitute an ASIC or the like.

The next step is for the electrically conductive elastic plug 27 constituting the via 26 to be placed in the respective cutout 24. This is preferably done by using a spray device 36 to place a metered amount of electrically conductive material in a liquid or pasty state in the respective cutout 24 from the outer side 17. Then a shaping tool 37 placed at the outlet opening of the cutout 24 is employed on the one hand to prevent the uncontrolled escape of the material composition and on the other hand to mold the desired shape of the contact making head or bump, such shape preferably being like a hemisphere.

The metered out amount of material may then be cured until the desired rubber-elastic final condition is achieved. If necessary energy is supplied.

In the case of this type of manufacture of the elastic plug 27 an optimum homogeneous connection is produced between the elastic material on the one hand and the support body 16 and bump 35 on the other hand.

However, there is the alternative possibility of providing a separately prefabricated elastic body as the elastic plug, which possesses the desired properties and is plugged into the cutout 24 as part of a plugging operation. In this case the dimensions of the elastic plug 27 are preferably so selected that it must be force fitted and in this manner a firm placement is achieved.

Owing to the contact making projection 35 or bump of spigot-like form a via passage 38 is defined which ensures a reliable contact with the printed wiring structure 19. In principle it would however be possible to provide the via 38,by simple stamping or other perforation operation in the printed wiring structure adjacent to the cutout 24. However, in order in this case to ensure reliable contact making it is to be recommended to provide a further contact making head 42 on the elastic plug 27 on the outer side 17, such head overlapping the printed wiring structure 29 in the peripheral zone of the via passage 38. Such a measure is however an advantage even in the case of the embodiment illustrated as well.

After the elastic plug 27 is installed a casting composition 43 is preferably in addition applied on the outer side 17 of the support body 16, such composition constituting, when cured, a protective casing for the wiring arrangement 23.

The complete wiring support 14 so produced may now be united with the further valve housing component 5 in order to complete the piezoelectric valve 1. Electrical leads for connection with other equipment may be connected with the connection contacts 23, such, leads serving for the transmission of signals and power between the wiring arrangement 15 and such external equipment, as for example an electronic controller.

Using the arrangement and method as described the acts of making contact, attachment in place, clamping and if necessary sealing of a plurality of components may be performed simultaneously to contact components and systems using a single component while at the same time allowing for manufacturing inaccuracies. It is possible furthermore for hot embossed MID wiring supports to be provided with vias for the first time. Both active and also passive components and systems may be joined together. Any manufacturing inaccuracies of components compensate each other completely owing to the elastic bump structure (contact making head 28). Using the at least one contact making head 28—in the working example two such contact making heads 28 are present—the piezoelectric valve, preferably the piezoelectric flexural transducer 7 in the form of a piezo-ceramic multi-layer actuator may not only be contacted but also secured in position. The at least one contact making head 28 thrusts the rear end portion 9 of the piezoelectric flexural transducer against the second housing part 5 so that it is clamped in place. It is in this manner that economic assembly of piezo-ceramic actuators with the controlling electronic circuitry is made possible using a simple joining operation.

A further advantage of the multi-functional contact element (elastic plug 27) is the simultaneous sealing function for sealing the valve chamber 3, filled with fluid, from the control electronic circuitry arranged externally on the support body 16.

A further advantage is that owing to bumps a substantial independence from the three-dimensional configuration of the components to be secured together and to be electrically contacted is attained. Accordingly, there is furthermore no difficulty as regards securing, electrically contacting and clamping curved components.

What is claimed is:

1. A piezoelectric valve comprising a valve housing, which defines a valve chamber, said valve chamber containing at least one actuating member in the form of a piezoelectric flexural transducer provided, for making electrical contact with the actuating member, with at least one contact face facing an upper part of the valve housing, wherein the said upper part of the valve housing is designed in the form of a wiring support, which possesses a support body consisting of plastic material, said body bearing, on the outer side opposite to the valve chamber, a wiring arrangement provided for electrical control of the piezoelectric flexural transducer and having electrical lines and/or electronic components, said wiring arrangement being in contact by way of at least one via, extending through a cutout in the support body, with the piezoelectric flexural transducer since such via comprises an electrically conductive elastic plug against which the at least one contact face for the piezoelectric flexural transducer is thrust at the inner side of the support body.

2. The piezoelectric valve as set forth in claim 1, wherein the wiring arrangement constitutes electronic control circuitry for the at least one piezoelectric flexural transducer.

3. The piezoelectric valve as set forth in claim 1, wherein the wiring support constitutes a cover of the valve housing.

4. The piezoelectric valve as set forth in claim 1, wherein the elastic plug is an elastic conductive elastomeric or rubber body.

5. The piezoelectric valve as set forth in claim 1, wherein the elastic plug comprises rubber-elastic material with embedded, electrically conductive particles.

6. The piezoelectric valve as set forth in claim 1, wherein the elastic plug comprises cured material with rubber-elastic properties originally introduced in a metered amount into the cutout while in a liquid or pasty state to then harden.

7. The piezoelectric valve as set forth in claim 1, wherein the elastic plug is an elastic body introduced in a prefabricated form in the cutout.

8. The piezoelectric valve as set forth in claim 1, wherein on the inner side facing the piezoelectric flexural transducer of the support body, the elastic plug possesses a contact making head producing the electrical contact with the associated contact face and projecting past the support body.

9. The piezoelectric valve as set forth in claim 8, wherein the contact making head possesses a larger cross section than the size of the cutout and overlaps the support body at the edge of the cutout.

10. The piezoelectric valve as set forth in claim 1, wherein the support body is constituted with at least part of the wiring arrangement as a molded interconnect device.

11. The piezoelectric valve as set forth in claim 1, wherein the wiring arrangement possesses electrical conductors, which is applied by hot embossing technology as printed wiring structures on the support body.

12. The piezoelectric valve as set forth in claim 1, wherein at least one electrical conductor in electrical contact with an elastic plug, of the wiring arrangement is arranged as a printed wiring structure on the first side of the support body and possesses a via passage aligned with the associated cutout, such via passage being defined by a spigot-like contact making projection formed by bent over sections of the printed wiring structure and extending in the cutout in a coaxial manner, such projection having the electrically conductive elastic plug extending through it.

13. The piezoelectric valve as set forth in claim 12, wherein the contact making projection is constituted by sections of the printed wiring structure, such sections being bent over by local piercing of the printed wiring structure.

14. The piezoelectric valve as set forth in claim 1, wherein the conductive elastic plug extends through the associated cutout of the support body while making sealing contact therewith.

15. The piezoelectric valve as set forth in claim 1, comprising a tabular support body, whose opposite sides define the outer side and the inner side.

16. The piezoelectric valve as set forth in claim 1, comprising a cast plastic composition on the outer side of the support body and surrounding the wiring arrangement, such composition preferably having electrical connection contacts projecting therefrom.

* * * * *